(12) United States Patent
Kowatari et al.

(10) Patent No.: US 7,040,439 B2
(45) Date of Patent: May 9, 2006

(54) HYBRID CAR CONTROL APPARATUS

(75) Inventors: Takehiko Kowatari, Kashiwa (JP); Norikazu Matsuzaki, Mito (JP); Masaru Ito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 181 days.

(21) Appl. No.: 10/639,532

(22) Filed: Aug. 13, 2003

(65) Prior Publication Data

US 2004/0094342 A1    May 20, 2004

(30) Foreign Application Priority Data

Sep. 3, 2002   (JP) .............................. 2002-257242

(51) Int. Cl.
 *B60K 28/16* (2006.01)
(52) U.S. Cl. ................... 180/197; 180/65.2; 701/22
(58) Field of Classification Search ............. None
See application file for complete search history.

(56) References Cited

U.S. PATENT DOCUMENTS

| 3,737,745 | A | * | 6/1973 | Chevaugeon et al. ......... 318/52 |
| 4,042,056 | A | * | 8/1977 | Horwinski .................. 180/65.2 |
| 5,368,120 | A | * | 11/1994 | Sakai et al. ................. 180/197 |
| 5,788,005 | A | * | 8/1998 | Arai .......................... 180/65.2 |
| 5,839,535 | A | * | 11/1998 | Arai .............................. 180/197 |
| 6,064,161 | A | * | 5/2000 | Takahara et al. ............ 318/139 |
| 6,349,782 | B1 | * | 2/2002 | Sekiya et al. ................ 180/65.2 |
| 6,434,469 | B1 | * | 8/2002 | Shimizu et al. ................ 701/84 |
| 6,634,303 | B1 | * | 10/2003 | Madsen et al. ................ 105/73 |

| 2001/0017225 | A1 | * | 8/2001 | Yamamoto et al. |
| 2001/0025219 | A1 | * | 9/2001 | Ohbe et al. |
| 2002/0005304 | A1 | * | 1/2002 | Bachman et al. |
| 2002/0107617 | A1 | * | 8/2002 | Tomikawa |

FOREIGN PATENT DOCUMENTS

| EP | 1 205 331    | 5/2002 |
| EP | 1 205 331 A2 | 5/2002 |
| JP | 2001-63392   | 3/2001 |

OTHER PUBLICATIONS

European Patent Office Search Report.

* cited by examiner

*Primary Examiner*—Christopher P. Ellis
*Assistant Examiner*—Christopher Bottorff
(74) *Attorney, Agent, or Firm*—Antonelli, Terry, Stout and Kraus, LLP.

(57) ABSTRACT

A motor control apparatus for a hybrid car is capable of reducing a spin of the wheel driven by the motor. The hybrid car comprises an engine driven wheel driven by an engine and a motor driven wheel to be driven by a motor for driving the wheel not driven by the engine. The hybrid car has an engine 11, a front wheel 12 driven by the engine 11, a generator 15 connected to this engine and driven thereby, an electric motor 13 for driving the rear wheel 14 using power provided by the generator without being driven by the engine, and a controller 20 mounted on the car to control the output of this electric motor. The controller 20 controls the field currents of the electric motor and generator in such a way that the driving torque of the motor driven wheel to be driven by the electric motor is smaller than the driving torque of the engine driven wheel to be driven by the engine, thereby ensuring traction and car stability.

4 Claims, 6 Drawing Sheets

FIG. 7

HYBRID CAR CONTROL APPARATUS

BACKGROUND OF THE INVENTION

The present invention relates to a hybrid car control apparatus wherein either the front wheels or the rear wheels of the car are driven by the engine and the other wheels are driven by a motor.

The present invention relates to a simplified hybrid car control apparatus wherein a car drive motor is directly driven using the electric power produced by a generator driven by an engine, without using the element that absorbs the electric power of a battery or a capacitor.

In a conventional hybrid car, when a wheel driven by the engine has slipped, the slip of the engine driven wheel is reduced by increasing the amount of the electric power produced by a generator connected to the engine, according to known method, for example, as disclosed in Japanese Application Patent Laid-open Publication No. 2001-63392 (see, paragraphs 21 and 22, and FIG. 4). However, this technique fails to give serious consideration to a simplified hybrid car system wherein a car drive motor is directly driven using the electric power produced by the generator driven by the engine, without using the element that absorbs the electric power of a battery or a capacitor.

This known configuration also increases the motor drive current if the amount of electric power produced by the generator is increased to reduce slip at an engine driven wheel, with the result that the motor torque is increased and wheel spin may occur at the motor driven wheel.

In accordance with the present invention, according to the result of various experiments carried out by the inventors of the present invention, what is meant by wheel spin in this connection is defined as a phenomenon in which the slip rate to be defined later (Equation. 2) is reduced below −0.25 when the peripheral speed of the wheel is greater than the car speed.

When wheel spin has occurred, there is a reduction in traction, i.e. a reduction in the torque transferred to the road surface by the wheel, with the result that the acceleration performance deteriorates. If the wheel spin of an engine driven wheel has disappeared, while a motor driven wheel is still subjected to wheel spin, there may be a lack of stability, for example, due to the spinning of the car. This phenomenon tends to occur especially in a car using a simplified hybrid car system where the engine drives the front wheel and the rear wheels are driven by an electric motor.

Further, when both a front wheel and a rear wheel are subjected to wheel spin, it becomes difficult to detect the car body speed, and an adverse effect will be given to other car operation control systems, such as the ABS. To detect the car speed in this case, a new sensor, such as an acceleration sensor, must be added, and this leads to a complicated system configuration and increased costs.

SUMMARY OF THE INVENTION

An object of the present invention is to provide a hybrid car control apparatus that reduces the spin of a wheel driven by a motor and ensures traction and stability in the operation of the car.

The above-stated problems in the conventional hybrid car can be solved by a control apparatus of a hybrid car according to the present invention comprising an engine; an engine driven wheel driven by the engine; an electric motor for driving the wheel not driven by the engine; a motor driven wheel to be driven by the electric motor; and a generator connected to the engine to supply power to directly drive the electric motor.

Wherein, an upper limit is set on the amount of electric power produced by a generator in conformity to the operating status of the car, and the upper limit is set to reduce wheel spin at the motor driven wheel.

Preferably, the above-stated problems can be solved by using a control apparatus of a hybrid car that provides control in such a way that the torque transferred to the road surface by the engine driven wheel of the car is detected, and a restriction is imposed on the amount of electric power produced by the generator in conformity to that torque.

To use a simpler configuration, the above-stated problems can be solved by using a control apparatus of a hybrid car that will provide control in such a way that the driving torque of the motor driven wheel is smaller than that of the engine driven wheel.

Further, to ensure both transaction and stability, these problems can be solved by using a controller of a hybrid car that provides control in such a way that the amount of the electric power produced by the generator is reduced if wheel spin has occurred at the motor driven wheel.

DESCRIPTION OF THE INVENTION

Figure 1:
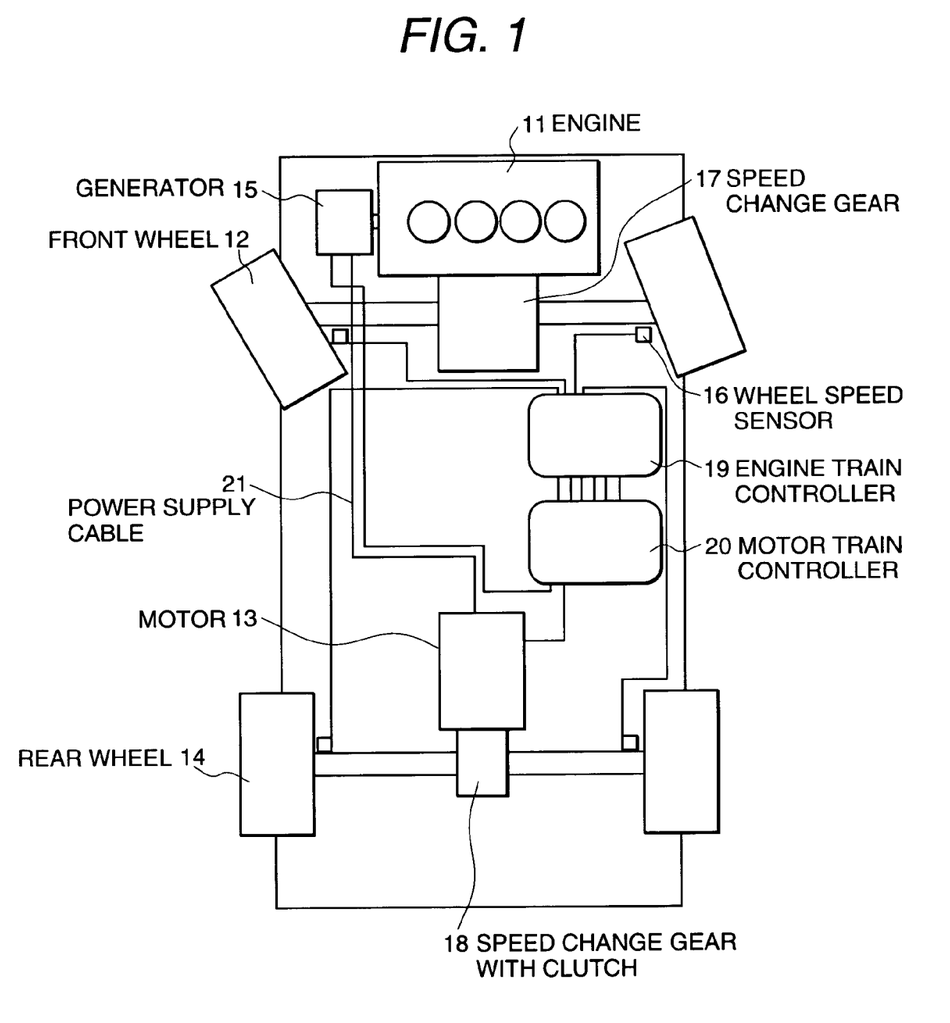
FIG. 1 is a diagram representing a hybrid car to which the present invention is applied.

FIG. 1 shows a hybrid car having the control apparatus of the present invention mounted thereon in accordance with an embodiment of the present invention.

In the hybrid car shown in FIG. 1, an engine 11 drives the front wheels 12 through a speed change gear 17 having a torque converter, and the motor 13 drives the rear wheels 14 through a speed change gear having a clutch 18. The motor 13 receives electric power directly through a power supply cable 21 from a special-purpose motor drive generator 15 that is mechanically connected with an output shaft of the engine 11. In other words, the generator 15 directly drives the motor 13.

This hybrid car also carries another generator (not illustrated) for supplying power to various electric loads, such as an engine ignition apparatus, electric lights and an air blow motor of an air conditioner, and this generator is not used to drive the motor 13.

Each wheel of the hybrid car is provided with a wheel speed sensor 16 for detecting the wheel speed. The output of the engine 11 and the gear ratio of the speed change gear 17 are controlled by an engine train controller 19. The output of the motor 13, the amount of electric power produced by the generator 15 and on-off operation of the speed change gear with a clutch 18 are controlled by a motor train controller 20. The motor train controller 20 controls both the motor field current and generator field current. It also controls the amount of electric power produced by the generator and the output of the motor.

Wheel spin occurs at the engine driven wheel when the applied torque is greater than that transferred by the engine driven wheel to the road surface, and this can occur for the following reasons. The torque transferred by the engine driven wheel to the road surface depends on the products among the friction coefficient μ between the wheels (in this case a total of four wheels) and the road surface, the load $W_z$ given by the wheel in the direction perpendicular to the road surface, and the tire effective radius R (wheel) during movement.

Here, the friction coefficient μ depends on the slip rate λ. The slip rate λ is defined as follows:

$$\lambda = (V - \dot{\theta}R)/V \qquad \text{Equation 1}$$

wherein V is the velocity of the hybrid car, θ is the angular velocity of the wheel, and R is the tire effective radius, where the numerator is positive, and is defined by $$\lambda = (V - \dot{\theta}R)/(\dot{\theta}R) \qquad \text{Equation 2}$$

where the numerator is negative.

Figure 2:
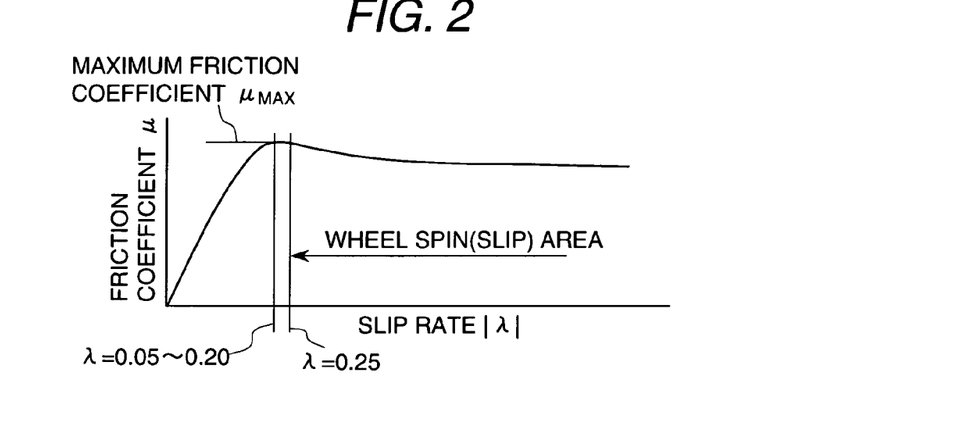
FIG. 2 is a graph showing the relationship between slip rate and friction coefficient.

In both Equation 1 and Equation 2, the slip rate λ (absolute value when λ is negative) and the friction coefficient μ are related to each other as shown in FIG. 2.

When the slip rate λ is in the range from 0 to 0.05 through 0.20, the friction coefficient μ exhibits a monotonous increase. When it is above this range, the friction coefficient μ is constant or reduced. The friction coefficient μ, the thrust F (car thrust) given to the car by the drive wheel and the torque T (car thrust) of the car at this time can be expressed by the following relationship, where the load of the wheel applied perpendicularly to the road surface is assumed as $W_z$:

$$F = \mu W_z \qquad \text{Equation 3}$$

$$T = \mu W_z R \qquad \text{Equation 4}$$

The following equation represents the wheel movement with consideration given to torque balance when the driving torque T (wheel drive) is applied to the wheel, where the above-stated (Equation 4) is included:

$$T1 = J\ddot{\theta} + T2 + T3 \qquad \text{Equation 5}$$

The left side of Equation 5 represents the driving torque T1 (wheel drive) for driving the wheel. The first term on the right side of Equation 5 represents the product between the inertia moment J (drive system) for rotation of the drive system, as viewed from the wheel, and the angular acceleration $\ddot{\theta}$ of the drive wheel obtained by differentiating the information on wheel speed with respect to time. It represents the torque used for acceleration of the wheel. The second term on the right side of Equation 5 represents the car torque T2 (car thrust) transferred to the road surface, as given in Equation 4, and it contributes to acceleration of the car body. The third term T3 represents the torque loss (transfer loss) caused by friction or the like during the rotation of the wheel.

As described above with reference to FIG. 2, the car torque T2 (car thrust indicated as the second term of the right side of Equation 5) depends on the friction coefficient μ, and it has an upper limit. Accordingly, if the wheel driving torque T1 (wheel drive) is increased, the angular acceleration of the wheel represented as the first term on the right side of Equation 5 is also increased. Thus, the wheel speed becomes greater than the car body speed, resulting in wheel spin.

To avoid wheel spin, it is necessary to ensure that the car torque T2 (wheel thrust) transferred to the road surface does not reach the upper limit. The friction coefficient μ between the road surface and the wheel always depends on both the status of the road surface and the status of the car motion, and this requires the upper limit to be variable. Thus, in the present embodiment, the following method is used to prevent the motor driven wheel from slipping.

Figure 3:
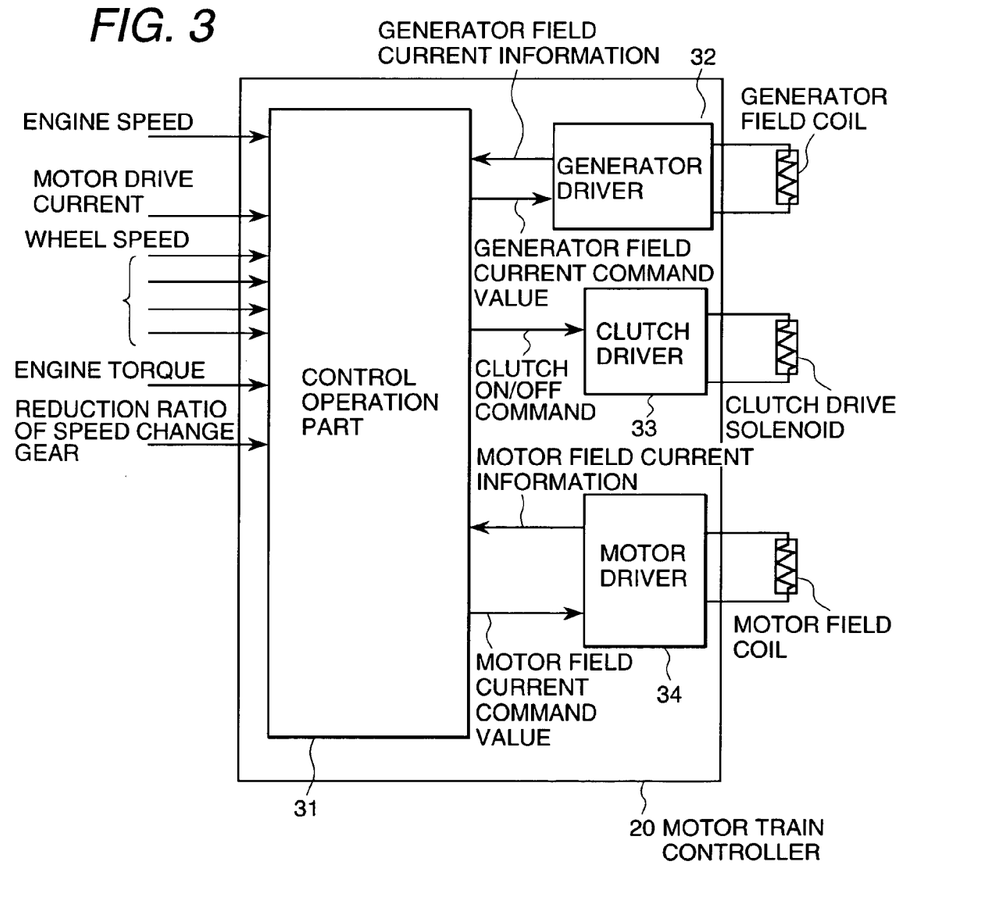
FIG. 3 is a block diagram of a motor train controller.

As shown in FIG. 3, the motor train controller 20 for controlling the driving torque to the motor driven wheel contains a control operation part 31 for signal input/output and operation, a generator driver 32 for controlling the current of the generator field coil, a clutch driver 33 for driving a clutch operating solenoid, and a motor driver 34 for controlling the motor field coil current.

As described above, the motor train controller 20 contains the control operation part and the drive circuit for the equipment controlling the motor drive force, so that it is characterized by excellent car mountability.

The control operation part 31 obtains from the engine train controller 19 information on the speed and torque of the engine 11, the speed change ratio of the speed change gear 17, and the speed of each wheel as detected by the wheel speed sensor 16. It further gets information on the field current of the generator 15 as detected by the current sensor incorporated in the generator driver 32, the field current of the motor 13 as detected by the current sensor incorporated in the motor driver 34, and the motor drive current flowing to the power supply cable 21 for driving the motor 13 as detected by another sensor.

Based on the above-described information, the control operation unit 31 sends a field current command value to the generator driver 32, a clutch solenoid on/off command value to the clutch driver 33, and a field current command value of the motor 13 to the motor driver 34.

Figure 4:
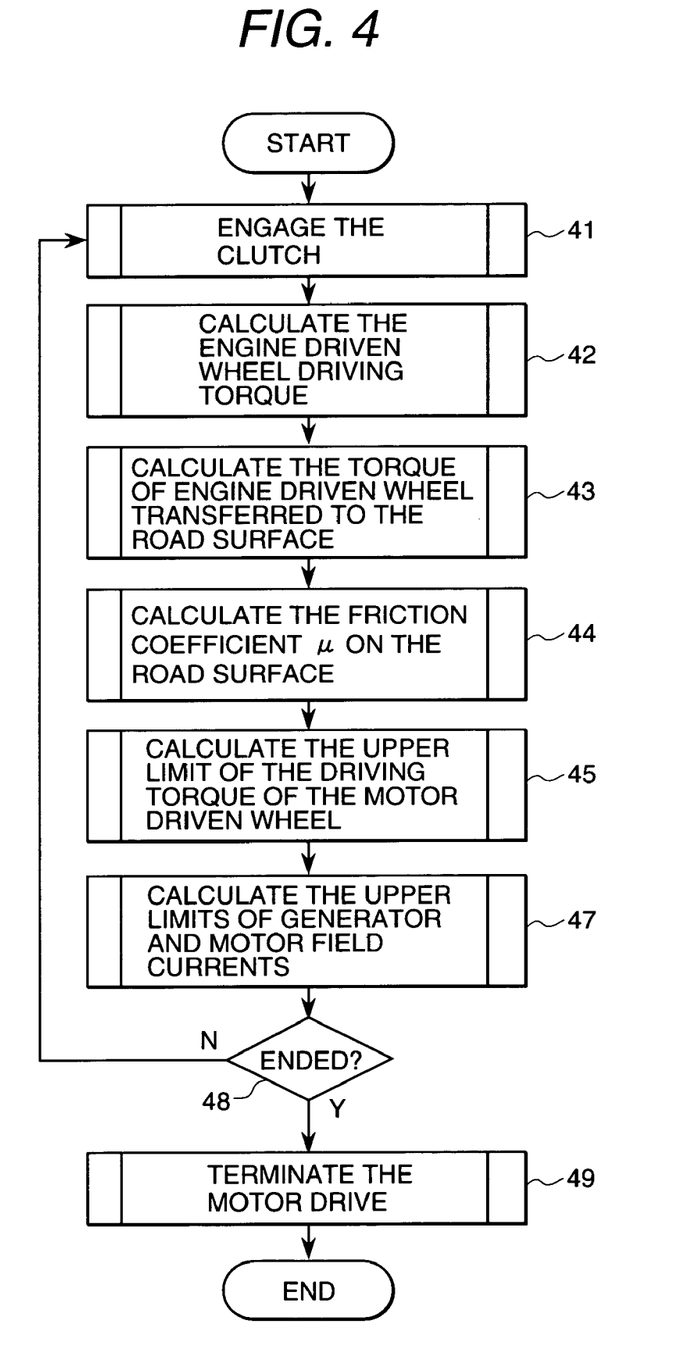
FIG. 4 is a flow diagram showing the control flow of the motor train controller.

FIG. 4 shows the control blocks contained in the control operation unit 31. Upon preparation for starting the car, the system proceeds to the block 41, and a command is given to the clutch driver 33 to engage the clutch. This corrects the delay in clutch engagement and allows motor torque to be applied to the motor driven wheel immediately. Upon engagement of the clutch, the system proceeds to the block 42.

Block 42 involves a step of calculating the torque applied to the engine driven wheel. In a car according to this embodiment, where there is no sensor for detecting the driving torque of the engine driven wheel, the following method may be employed as means for estimating the torque applied to the engine driven wheel: The rotary speed of the torque converter output shaft is obtained from the information on engine driven wheel speed and the current gear ratio of the speed change gear.

The drive force transfer characteristics map of the torque converter, which has been stored in advance, is retrieved from this information and from information on the engine speed equivalent to the rotary speed of the torque converter input shaft, thereby obtaining the torque issued from the torque converter.

Then, the torque obtained in this manner is multiplied by the gear ratio of the speed change gear and the differential gear ratio stored in memory, thereby obtaining the driving torque $T1_1$ (wheel drive, 1) which is applied to the engine driven wheel.

Block 43 involves a step of calculating the torque transferred to the road surface. The following equation is used for this calculation:

$$T2_1 = T1_1 - J_1 \ddot{\theta}_1 - T3_1 \qquad \text{Equation 6}$$

the suffix "1" denotes the engine driven wheel.

The left side of Equation 6 represents the torque transferred to the road surface by the left wheel. The first term on the right side of Equation 6 denotes the torque applied to the engine driven wheel that was obtained in the preceding block, and the second term on the right side of Equation 6 represents the torque used for acceleration of the wheel, which is equivalent to the product between the equivalent moment of inertia from the wheel to the torque converter output shaft with reference to the wheel, which is stored in advance, and the wheel angular acceleration obtained by differentiating the wheel speed sensor of the engine driven wheel. The third term on the right side of Equation 6 shows the drive transfer loss, which is set in advance.

Block 44 involves a step of calculating the friction coefficient $\mu_1$ between the road surface and engine driven wheel. Here, the following equation using the obtained $T1_1$ (car thrust, 1) is employed. It goes without saying that another means for estimating and detecting the friction coefficient $\mu_1$ can be used, if any.

$$\mu_1 = W_{z1} R / T1_1 \qquad \text{Equation 7}$$

The load $W_{z1}$ applied by the wheel perpendicularly to the road surface changes according to the acceleration of the car and the weight of the load on the car. It is most preferred if this can be detected or estimated, but there is no practical problem when the load $W_{z1}$ is constant, since there is no big change such as $T1_1$ (car thrust, 1).

Block 45 involves a step of calculating the upper limit of the driving torque of the motor driven wheel that can be applied without causing wheel spin at the motor driven wheel (the slip ratio is less than 0.25), where the friction coefficient $\mu_1$ obtained in Equation 7 is used to predict the value.

The following equation of motion is obtained when consideration is given to the motion of the motor driven wheel:

$$T1_2 = J_2 \ddot{\theta}_2 + T2_2 + T3_2 \qquad \text{Equation 8}$$

Provided that:

$$T2_2 = C \mu_1 W_{z2} R \qquad \text{Equation 9}$$

where suffix "2" denotes the motor drive wheel.

The left side in Equation 8 represents the driving torque of the motor driven wheel. The first term on the right side of Equation 8 denotes the product between the equivalent inertia moment of the motor drive system with reference to the motor drive shaft and the angular acceleration obtained on the basis of the information of the wheel speed sensor on the motor drive shaft. The second term on the right side of Equation 8 is determined by Equation 9, and it represents the torque transferred to the road surface by the friction coefficient $\mu_1$.

C represents a constant obtained from a car test, and it is used to set the margin for avoiding slip caused by the wheel driving torque. Normally, this constant is "1". Slip is less likely to occur when of this value is reduced. $W_{z2}$ represents the load of the motor driven wheel. R (the tire effective radius) represents the radius of action of the wheel, and $T3_2$ (transfer loss, 2) as a third term of Equation 8 denotes the torque transfer loss in the motor drive system.

Equation 8 represents the relationship between the driving torque applied to the motor driven wheel and the factor for the driving torque to be consumed, similarly to Equation 5. The first term on the right side of Equation 8 can be set according to the information received from the wheel speed sensor, the second term can be set according to Equation 7 and Equation 9, and the third term can be set by empirical means. This makes it possible to obtain $T1_2$ (wheel drive, 2) on the left side of the Equation 8.

To study this from a different viewpoint, the torque $T1_2$ (car body thrust, 2) that can be transferred to the road surface as the second term is determined; therefore, wheel driving torque $T1_2$ (wheel drive, 2) that does not cause wheel spin is also determined. This provides the effect of minimizing the wheel spin by control that ensures that the wheel driving torque driven by the motor does not exceed the $T1_2$ (wheel drive, 2) obtained from Equation 8.

Block 47 involves a step of determining the upper limit value T (motor upper limit) of the motor torque so that it does not exceed the upper limit value $T1_2$ (wheel drive, 2) of the driving torque of the motor driven wheel obtained in block 45.

$$T_{ul} < T1_2 / GR \qquad \text{Equation 10}$$

where $T_{ul}$ denotes the upper limit of the motor, and GR (motor deceleration) denotes the reduction ratio of the speed change gear with clutch 18.

The motor driving torque is directly coupled with the motor 13 and the generator 15 that supplies power to the motor 13, and it is therefore determined by both the motor drive current produced by the generator and the motor field current. More specifically, the torque constant of the motor is obtained by referring to the previously stored motor field current, the map of the motor torque constant and the current field current.

The upper limit value $T_{ul}$ (motor upper limit) of the motor torque is divided by the torque constant to find the motor drive current, and the result is used as the upper limit value. A generator driver 32 controls the generator field current in such a way that the motor drive current does not exceed the upper limit value.

In block 48, in response to the decision on whether or not motor drive of the motor driven wheel is required, control is provided in such a way that the system returns to the block 41 if motor drive is required. If motor drive is not required, the system proceeds to the block 49.

In block 49, in order to stop the motor torque being applied to the motor drive shaft, the motor torque is gradually reduced. When the motor torque has been reduced to a level below the preset threshold value, a command is sent to the clutch driver 33 to disengage the clutch. Upon receipt of this command, the clutch driver stops the current of the clutch drive solenoid and disengages the speed change gear with clutch 18.

As described above, drive wheel spin can be minimized by controlling the motor torque so as not to exceed the upper limit value of the motor torque obtained in Block 45. Especially in a hybrid car where a generator is directly coupled to a motor and the power produced by the generator cannot be absorbed, the power produced by the generator is directly supplied to the motor.

Accordingly, the field current values of the generator and motor are controlled in such a way that the motor torque is set to not exceed the upper limit value obtained in Block 45. Alternatively, the generator field current determined in block 45 is used as the upper limit value and a control apparatus is used to provide control in such a way that the field current does not exceed this value. This method is effective in avoiding motor driven wheel spin.

Although the transient performance is inferior, motor drive wheel spin can be reduced by the following simplified control method, when the above-stated control lies far outside the operation capacity of the control operation part 31; when there is a big error in the information on the wheel speed provided by the wheel speed sensor so that the wheel angular acceleration cannot be determined; when the front wheel is located close to the rear wheel; when the moment of inertia in the engine drive system is close to that in the motor drive system; or when the transfer loss of the torque transferred to the wheel from the engine or motor can be ignored.

When consideration is given to the above-stated conditions, the equation of motion in Equation 5 can be simplified as follows:

$$T1' \cong T2' \qquad \text{Equation 11}$$

where $T1'$ denotes the wheel drive torque value and $T2'$ denotes the car trust value. Then, the friction coefficient $\mu_1$ of the engine driven wheel can be expressed as follows:

$$\mu'_1 \cong W_{z1} R_f / T2'_1 \qquad \text{Equation 12}$$

Thus, the upper limit torque transferred to the road surface by the motor driven wheel can be obtained from the following equation.

$$T1'_2 \cong \mu'_1 W_{z2} R \qquad \text{Equation 13}$$

When the load $W_{z1}$ of the front wheel on the road surface is close to the load $W_{z2}$ of the rear wheel on the road surface, the following equation can be obtained:

$$T1'_2 \cong \mu'_1 W_{z2} R \cong \mu'_1 W_{z1} R \cong T'1_1 \qquad \text{Equation 14}$$

To get the upper driving torque of the motor driven wheel using Equation 14 and Equation 11, the following equation can be employed:

$$T1'_2 \cong T1' \qquad \text{Equation 15}$$

Thus, the wheel spin can be minimized by ensuring that the driving torque of the motor driven wheel does not exceed the driving torque of the engine driven wheel. In this case, the computation is simplified because there is no need for calculating the speed or the like from the sensor. More specifically, the upper limit of the motor torque should be set in such a way that the following equation holds:

$$T'_{ul} < T1'_1 / GR \qquad \text{Equation 16}$$

Figure 6:
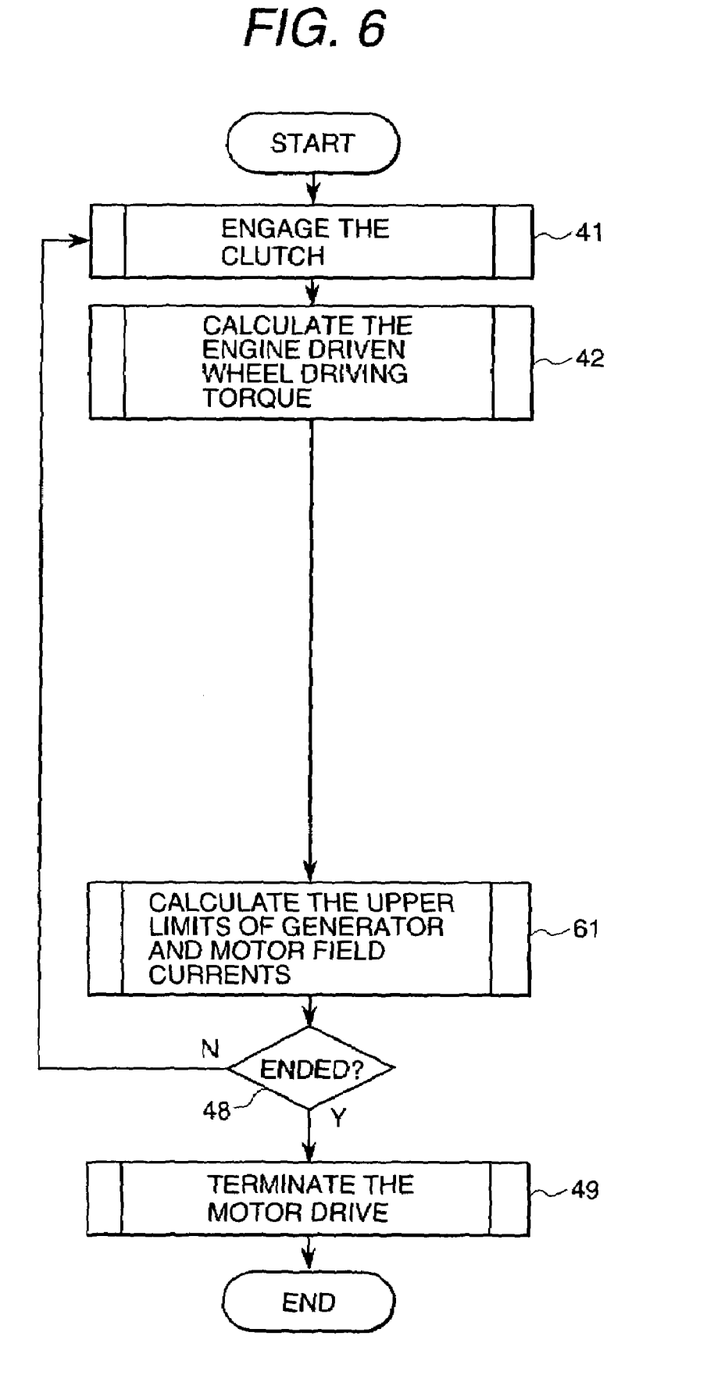
FIG. 6 is a flow diagram showing the control flow of a simplified motor train controller.

FIG. 6 shows the control flow employed to achieve the above-mentioned equation. Unlike the flow described with reference to FIG. 4, after calculation of the torque driving the engine drive wheel in Block 42, the motor torque upper limit value is determined in Block 61, with the torque driving the engine driven wheel being used as the upper limit value of the motor driven wheel driving torque.

Then, the torque constant is calculated from the motor field current to determine the motor drive current as the upper limit. The motor train controller controls the generator field current in such a way that the motor drive current does not exceed the obtained upper limit.

As described above, when the generator current, i.e. the amount of generated power is restricted, wheel spin can be reduced. To ensure more reliable reduction of the wheel spin, it is also effective to reduce the amount of power produced by the generator when motor drive wheel spin has occurred.

Figure 7:
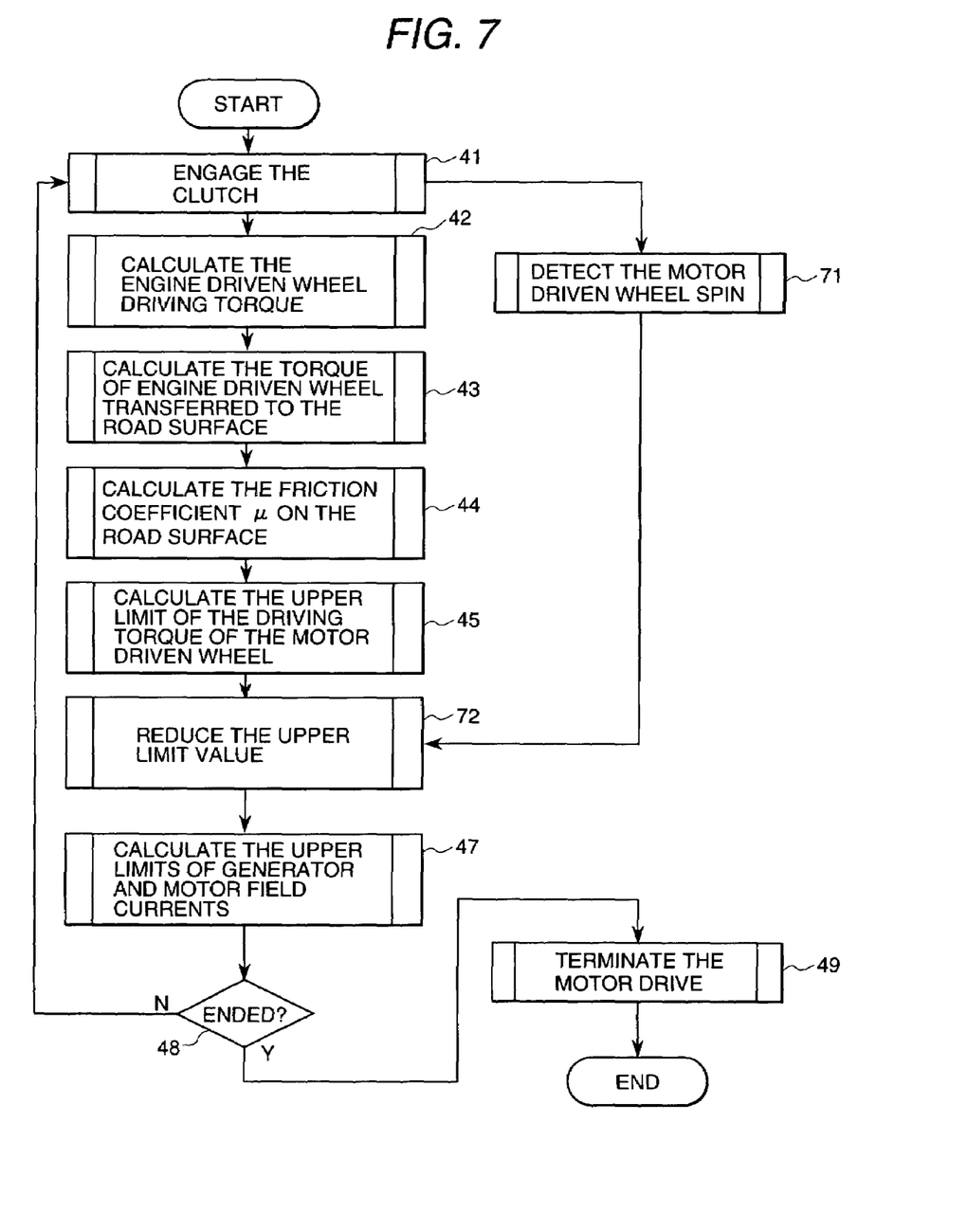
FIG. 7 is a flow diagram showing the control flow of the motor train controller for further reduction of wheel spin.

FIG. 7 shows the control flow. It exhibits execution of the flow already described with reference to FIG. 4 or FIG. 6. At the same time, a block for detecting wheel spin is additionally provided, as shown by Block 71.

When wheel spin has occurred, the upper limit value of the motor driven wheel driving torque calculated in Block 45 is set close to zero or to a level lower than the driving torque in Block 72, so that the amount of power produced by the generator is reduced. This procedure further reduces the wheel spin of the motor driven wheel.

Figure 5:
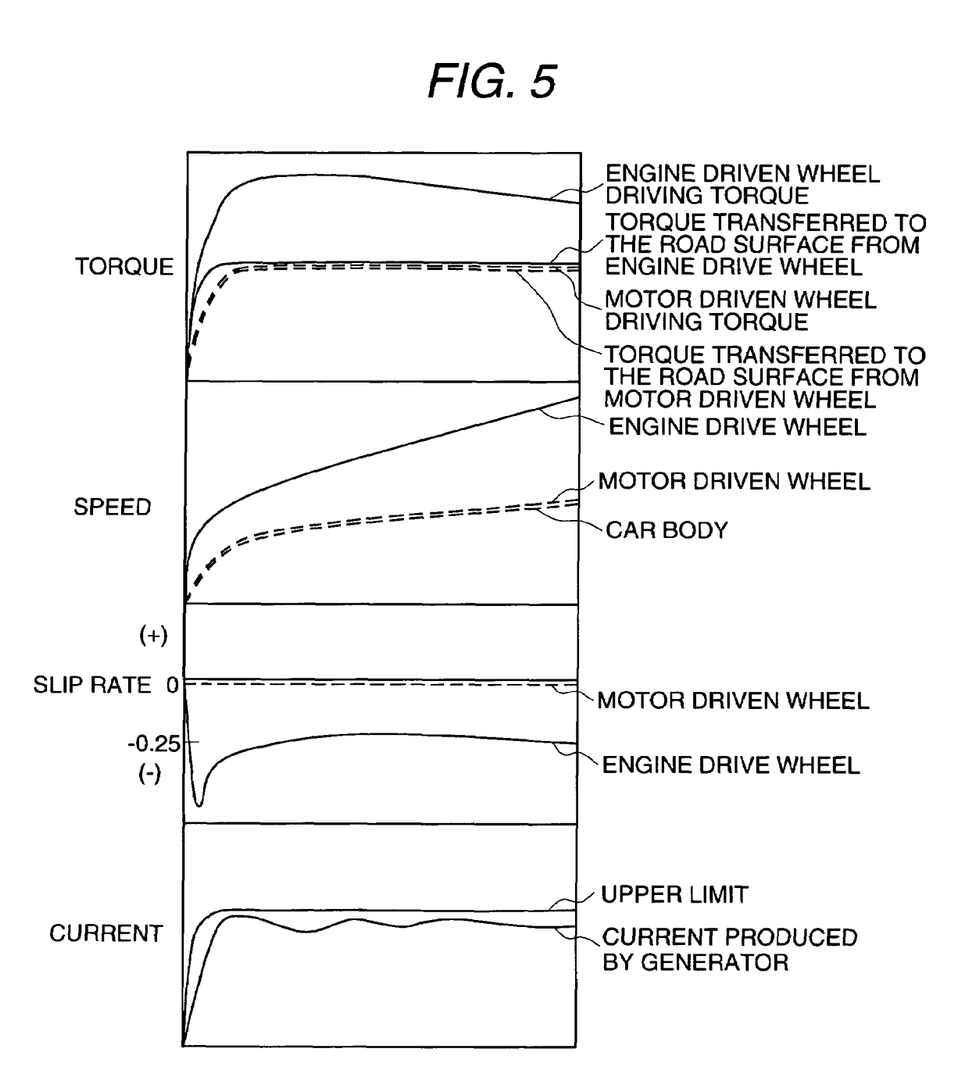
FIG. 5 is a series of graphs representing conditions of the car traveling status when the present invention is applied.

FIG. 5 shows the effect obtained from driving the wheel using the control apparatus according to the present invention. In FIG. 5, the driving torque of the engine driven wheel and motor driven wheel, the torque transferred to the road surface, the speeds of the motor driven wheel and engine driven wheel, the car body speed, the slip rate of each wheel, and the current made to flow by power produced from the generator are plotted on the vertical axis, while time is plotted on the horizontal axis.

Two engine driven wheels and two motor driven wheels are provided, and they are each represented in terms of average values. In each wheel, the torque transferred to the road surface cannot be measured directly, so the torque transferred to the road surface is obtained by subtracting the product between the moment of inertia and the angular acceleration from the driving torque of each wheel. A test is conducted by fully opening the throttle valve when the car is at a standstill at time 0.

As a result, the slip rate of the engine drive wheel does not exceed −0.25, and the wheel spin occurs immediately. This can also be read from the relationship between the engine driven wheel driving torque and the torque transferred to the road surface. The torque transferred to the road surface is saturated at a value of about half the driving torque. Accordingly, the remaining driving torque is used to accelerate the wheel, with the result that there is a car body speed increase and a more abrupt speed increase.

Since a restriction is imposed on the current produced from the generator, the motor driven wheel driving torque is smaller than the engine driven wheel driving torque, and the torque transferred to the road surface by the motor driven wheel is less than that by the engine driven wheel; therefore, a motor driven wheel spin does not occur.

This can be verified from the fact that there is agreement between the motor driven wheel slip rate plot and the car speed plot, and that there is approximate agreement between the torque transferred to the road surface by the motor driven wheel.

Restrictions are imposed on the generator output or motor output so that the driving force transmitted to the road surface from the wheel driven by the motor is smaller than the driving force transmitted to the road surface by the wheel driven by the engine, whereby the motor driven wheel is prevented from spinning, traction is ensured and the car stability is improved.

What is claimed is:

1. A control apparatus for a hybrid car having an engine; an engine driven wheel driven by said engine; an electric motor for driving a wheel; a motor driven wheel to be driven by said electric motor; and a generator connected to said engine to directly drive said electric motor;

said control apparatus of the hybrid car being characterized in that:

the amount of electric power produced by said generator is controlled in such a way that the driving torque of the motor driven wheel is smaller than that of said engine driven wheel; and said amount of electric power is limited to reduce a wheel spin of said motor driven wheel.

2. A control apparatus for a hybrid car having an engine; an engine driven wheel driven by said engine; an electric motor for driving a wheel; a motor driven wheel to be driven by said electric motor; and a generator connected to said engine to directly drive said electric motor;

said control apparatus being characterized in that the amount of electric power supplied to said motor is reduced whenever wheel spin has occurred at said engine driven wheel.

3. A hybrid car comprising:

an engine;

an engine driven wheel driven by said engine;

an electric motor for driving a wheel;

a motor driven wheel to be driven by said electric motor;

a generator connected to said engine to directly drive said electric motor; and a control apparatus for controlling said generator such that the amount of electric power produced by said generator is controlled in such a way that the driving torque of the motor driven wheel is smaller than that of said engine driven wheel, and said amount of electric power is limited to reduce wheel spin of said motor driven wheel.

4. A hybrid car comprising:

an engine;

an engine driven wheel driven by said engine;

an electric motor for driving a wheel;

a motor driven wheel to be driven by said electric motor;

a generator connected to said engine to directly drive said electric motor; and a control apparatus for effecting control such that the amount of electric power supplied to said motor is reduced whenever wheel spin has occurred at said engine driven wheel.

* * * * *